United States Patent [19]

Rossi

[11] 4,303,436
[45] Dec. 1, 1981

[54] PROCESS AND APPARATUS FOR THE PRODUCTION OF GLASS FOIL

[75] Inventor: Quido Rossi, Zurich, Switzerland

[73] Assignee: Micafil AG, Zurich, Switzerland

[21] Appl. No.: 199,086

[22] Filed: Oct. 20, 1980

[30] Foreign Application Priority Data

Oct. 22, 1979 [CH] Switzerland .................. 9440/79

[51] Int. Cl.³ .................. C03B 19/00; C03B 40/04
[52] U.S. Cl. .................. 65/67; 65/25.1; 65/87; 65/170; 65/187; 65/DIG. 5
[58] Field of Search .................. 65/67, 70, 87, DIG. 5, 65/184, 187, 25.1, 170

[56] References Cited

U.S. PATENT DOCUMENTS

| | | | |
|---|---|---|---|
| 2,251,727 | 8/1941 | Wellech et al. | 65/187 X |
| 2,450,115 | 9/1948 | Byrnes | 65/184 |
| 2,502,312 | 3/1950 | Danner | 65/187 X |
| 2,910,805 | 11/1959 | Müller et al. | 65/87 X |
| 3,257,184 | 6/1966 | Glaser | 65/87 X |

FOREIGN PATENT DOCUMENTS

| | | | |
|---|---|---|---|
| 621856 | 6/1961 | Canada | 65/67 |
| 685037 | 4/1964 | Canada | 65/87 |
| 1250609 | 9/1967 | Fed. Rep. of Germany. | |

*Primary Examiner*—Richard V. Fisher
*Attorney, Agent, or Firm*—Burns, Doane, Swecker & Mathis

[57] ABSTRACT

A process and apparatus for producing glass foil is disclosed in which a thin glass foil is produced by conveying a glass melt from a rotatable crucible of a smelting furnace through an annular distribution reservoir and a distributing disk having flow-through slots. Jets of glass emerge from the flow-through slots and are combined at a funnel-shaped wall into a hollow, cylindrical glass mass. Due to its weight and to heating by pressurized, gas-heated heating and cooling zones, the cylindrical glass mass flows downward, and is stretched until it reaches a pre-determined wall thickness by auxiliary conveyor belts. The hollow cylinder of glass is then split on one side by a separating device, flattened, conveyed to a bath of liquids, and then drawn-off at full width in the form of a glass foil by a draw-off guide roller. After the glass foil is drawn-off, the auxiliary conveyor belts are moved laterally so that they are no longer in physical contact with the glass cylinder. The glass foil is conveyed from the bath of liquids, through an after-treatment zone wherein the glass foil is treated, and to a device for coiling the treated glass foil.

9 Claims, 1 Drawing Figure

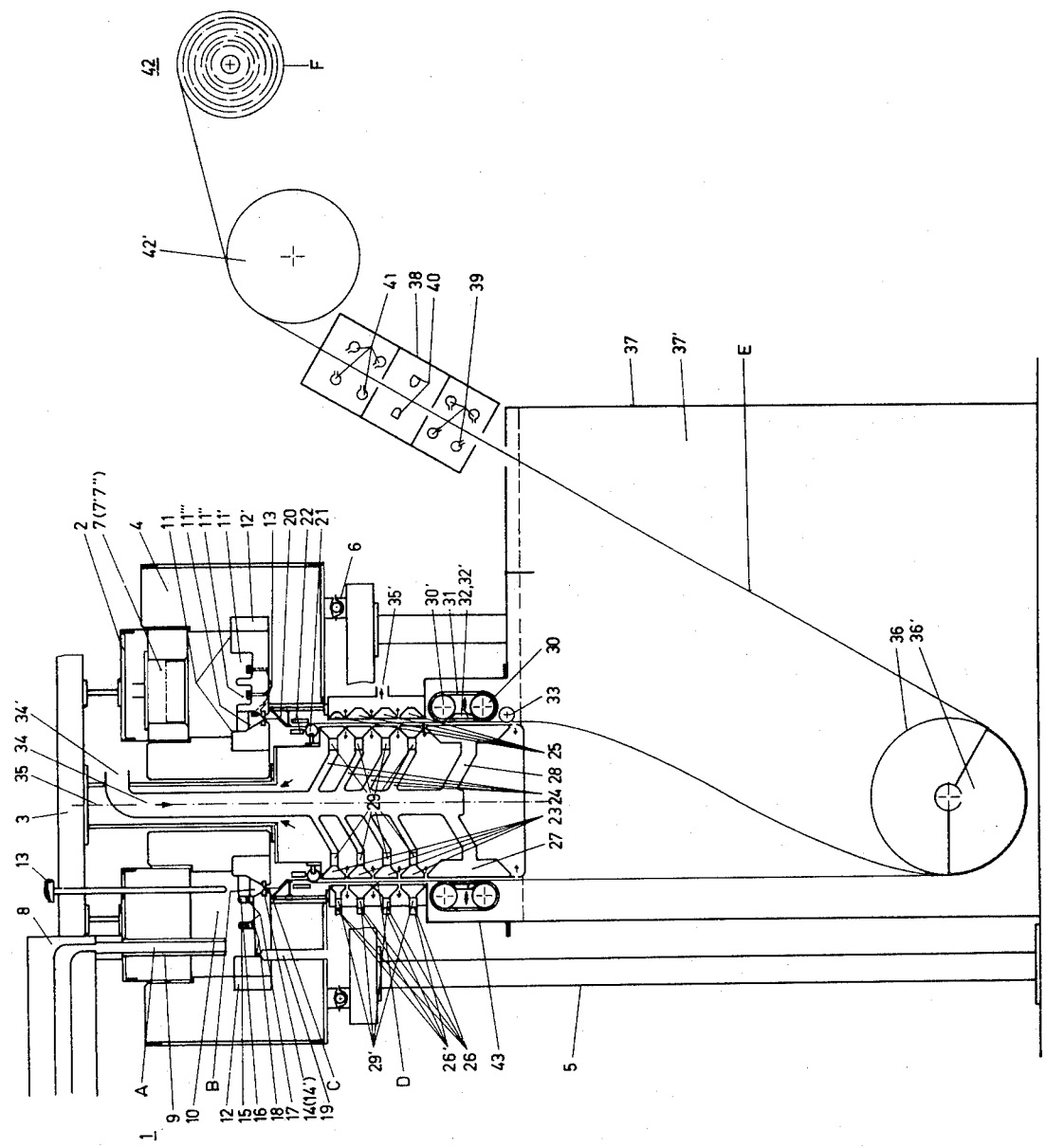

PROCESS AND APPARATUS FOR THE PRODUCTION OF GLASS FOIL

BACKGROUND AND SUMMARY OF THE INVENTION

This invention relates generally to processes and apparatus for producing glass foils, and more particularly to a process and apparatus for producing a glass foil using a gaseous blowing agent wherein a glass melt is continuously drawn from a heated crucible of a smelting furnace.

Processes and devices are known wherein glass is heated in a smelting furnace until it reaches its melting point, the molten glass divided into jets of glass by circularly distributed discharge apertures, and the jets of glass combined into a tubularly formed body which can then be drawn-out to a thin cylindrical foil. Processes and devices are also known wherein a glass tube drawn from a stock of molten glass is inflated by a gaseous medium and then pressed together and split on both sides. After being split on both sides, the glass cylinder is wound onto cylinders or reduced to glass flakes.

The glass foils or flakes produced in accordance with the known processes and devices are suitable for reinforcing or strengthening plastics, rubber, asphalt, Portland cement and the like. However, such glass foils or flakes are suitable only to a limited degree for insulation that is subjected to high electrical stresses. Such insulation requires glass foils or flakes that are entirely flat and free from the curls and twists produced during the manufacture of glass foils according to such known processes and devices as a result of local concentrations of heat and fluctuations in wall thicknesses which cannot always be avoided, especially when due to the influence of the outside atmosphere.

Therefore, it is an object of the present invention to provide a process for the production of glass foils, as well as to provide an apparatus for the practical application of such a process which will allow glass foils to be drawn from a mass of glass such that the glass foils have walls of uniform thickness, are entirely straight, and are free of curls and twists.

According to a preferred embodiment of the present invention, a glass melt is heated in a smelting furnace until the glass reaches its melting point. The glass is then conveyed through distribution reservoir to a plurality of annularly arranged distributing slots. The glass flows through the distributing slots and emerges from the slots in a plurality of jets of glass. The jets of glass are then combined at a funnel-shaped wall to form a hollow, cylindrical mass of glass or glass cylinder. The glass cylinder flows downward due to its own weight through heating and cooling zones which are under pressure and gas-heated. The glass cylinder is cooled for shaping and is grasped by circumferentially arranged auxiliary conveyor belts. The glass cylinder is then stretched by the auxiliary conveyor belts while the glass is still in its plastic state to a pre-determined wall thickness. The hollow cylinder is then separated at one side with a separating device and the glass bent so as to form an essentially flat or planar mass of glass. The planar mass of glass is then conveyed into a hot bath of liquids. A draw-off guide roller arranged in the bath then draws-off glass foil in full width. The glass fil is then conveyed from the bath through an after-treatment zone in which the glass foil is treated to a coiling device which coils the treated glass foil.

Apparatus according to a preferred embodiment of the present invention includes a revolving crucible which is electrically heated. The crucible has a pre-melting reservoir, a main-melting reservoir connected to the pre-melting reservoir, and a distribution reservoir connected to the main-melting reservoir. Connected to the distribution reservoir is an annular distributing disk having a plurality of flow-through passages, preferably distributing slots, which open onto a funnel-shaped wall. Heating and cooling zones are included and disposed about the hollow glass cylinder drawn from the crucible so as to form a gas cushion about the glass cylinder. Adjacent to the heating and cooling zones are auxiliary conveyor belts which are used to stretch the glass cylinder to a pre-determined wall thickness. A packing/distance tube is included to seal the apparatus from the outside atmosphere. A bath is also included, as is a seal which is coaxial with the heating and cooling zones and which extends up to the bath. A separating device is arranged between the seal and the bath, and a draw-off guide roller is arranged in the bath. An after-treatment zone is arranged outside the bath as is a device for coiling the glass foil after treatment.

The present invention provides for precise, predetermined temperature control of the individual heating and cooling zones and of the bath of liquid. Such control permits the heated glass cylinder to be uniformly cooled and permits the manufacture of thin and flat glass foils which are free of curls and twists.

BRIEF DESCRIPTION OF THE DRAWING

The preferred embodiments of the present invention are described with reference to the accompanying schematic drawing of apparatus for the production of glass foil according to the present invention.

DESCRIPTION OF THE PREFERRED EMBODIMENTS

Referring to the drawing, a smelting furnace 1 includes an upper part 2 stationarily arranged at a frame 3, and a lower part 4 arranged rotatably at a frame 5 by way of a mounting unit 6. The upper part 2 of the furnace has a heating device 7 which includes a plurality of circularly arranged gas burners 7' and a plurality of circumferentially arranged nozzles 7''.

A glass material A is fed by a glass feed 8 into a glass-charge opening 9 which protrudes into a melting chamber 10. The glass-charge opening 9 is arranged above a rotatable pre-melting reservoir 11' so that the pre-heated glass material A will be uniformly distributed within the annularly designed pre-melting reservoir 11' of a crucible 11 and thus form a glass melt B.

The crucible 11 includes the pre-melting reservoir 11', a main-melting reservoir 11'' and a distribution reservoir 11'''. The reservoirs 11', 11'' and 11''' are designed in the form of circular ducts separated by barriers 15, 16. The barriers 15, 16 are arranged between the reservoirs and include pass-through ducts 17. The walls of the crucible 11 are heated, for example inductively, using electrical terminals 12, 12'. Several temperature sensors 13 are included to insure the proper temperature control of the molten mass within the pre-melting reservoir 11', the main-melting reservoir 11'' and the distribution reservoir 11'''.

The glass melt B first reaches the main-melting reservoir 11'' from the pre-melting reservoir 11' by way of the pass-through ducts 17 located in the barriers 15 and 16, and from there the distribution reservoir 11'''. The smelting furnace 1 can be emptied at shut-down by removing the glass melt B from the main-melting reservoir 11'' through a discharge pipe 19 by way of discharge apertures 18 and the pre-melting reservoir 11'.

The glass melt B, heated to its pouring point, enters the distribution reservoir 11''' and then enters an annularly shaped distributing disk 14. The disk 14 is provided with circularly arranged flow-through passages 14', preferably in the form of distributing slots. The distributing reservoir 11''' and the flow-through passages 14' each taper-off in the downward direction. A plurality of jets of glass C emerge from the distributing slots 14', and are combined into one single surface at a funnel-shaped wall 20 to form a hollow, cylindrically shaped mass of glass. Below the wall 20 there are arranged, on both sides of the cylindrical mass of glass being formed, terminal walls 22 which are used for heat extraction.

The glass mass flows by its own weight downwardly through heating and cooling zones 23, 25, 27 which are under positive pressure and is heated on both sides. The glass mass is then grasped by circumferentially arranged auxiliary conveyor belts 31. The heating and cooling zones 23, 25, 27 include heating sections followed by cooling sections, and form a gas cushion on both sides of the inner and outer casings of the glass cylinder D. A packing/distance tube 21 is included as a seal against the outer atmosphere, and is followed by the auxiliary conveyor belts 31, a seal 43 and a hot bath of liquids 37'.

The auxiliary conveyor belts 31 are used to stretch the cylinder of glass D, which is still in its plastic state, until the cylinder of glass reaches a pre-determined wall thickness. The cylinder is then opened-up or separated on one side by a separating device 33 which is known per se and the glass bent into a substantially planar mass of glass. The planar mass of glass is then conveyed to a liquid holding tank 37 having a hot bath of liquids 37'. A draw-off guide roller 36 for the removal of glass foil E is arranged in the bath. The draw-off guide roller 36 may be equipped with a suction chamber 36'0 in order to increase the adhesion of the glass foil E to the draw-off guide roller 36 without any excessive stresses. The separating device 33 is placed on one side of, and above the bath of liquids 37'.

The inner heating and cooling zones 23, 27 are connected with a main duct 34 by ducts 24, 28 which are equipped with heaters 29. The outer heating and cooling zones 25 are connected with the main duct 34 by ducts 26 equipped with heaters 29'.

The pressure medium, for example air, is carried by an entrance port 34' of the main duct 34 and entrance ports 26' of the outer ducts 26, and escapes to the outer atmosphere by way of discharge apertures 35, 35'. The heating and cooling zones 23, 25, 27 that form the gas cushion are thus kept at a constant positive pressure, which results in the glass cylinder D maintaining its shape at all times and local thermal stresses being eliminated. Slots are arranged between the individual heating and cooling zones 23, 25, 27 and the pressure medium, heated to a specific temperature, can escape through these slots in the direction indicated by the arrows, thus insuring a precise temperature control of the several heating and cooling zones 23, 25, 27.

Each of the auxiliary conveyor belts 31 are located beyond the outer casings of the glass cylinder D, and include one drive cylinder 30 and one guide cylinder 30' with low-pressure chambers 32, 32' arranged between them. After the immersion of the sliced glass cylinders D into the liquid and the transfer of the glass foil E, formed in this manner, to the draw-off guide roller 36, the auxiliary conveyor belts 31 can be moved away laterally so that they will be out of contact with the glass cylinder D.

Upon leaving the bath of liquids 37', the glass foil E passes through an after-treatment zone 38 and is then directed by a deflection pulley 42' to a coiling device 42 which coils the glass foil into a roll of glass foil F. Within the after-treatment zone 38 there may be arranged nozzles 39 for drying the glass foil E, as well as nozzles 40 for coating the glass foil E. A device 41 may also be included for drying or tempering the glass foil E.

The drive cylinders 30, the draw-off guide roller 36, the deflection pulley 42' and the coiling device 42 are controlled synchronously by respective drives.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A process for producing glass foil using a gaseous blowing agent wherein a glass melt is continuously drawn from a heated crucible of a smelting furnace, comprising the steps of:
   (a) heating glass in a smelting furnace until the glass reaches its melting point, and then forming the glass into a plurality of glass streams;
   (b) combining the plurality of glass streams to form a hollow, cylindrical mass of glass;
   (c) selectively treating and cooling the hollow cylindrical mass of glass under pressure so that the glass reaches its plastic state, and then shaping said glass while in its plastic state, said step of shaping incuding:
      (1) stretching the hollow, cylindrical mass of glass to a predetermined wall thickness; and then
      (2) separating the hollow, cylindrical mass of glass on one side and then bending the mass of glass into a substantially planar mass of glass;
   (d) conveying the planar mass of glass to a hot bath of liquids and therein drawing-off glass foil;
   (e) treating the glass foil; and
   (f) coiling the treated glass foil.

2. A process for producing glass foil using a gaseous blowing agent wherein a glass melt is continuously drawn from a heated crucible of a smelting furnace, said furnace having a distribution reservoir feeding annularly arranged distributing slots, having circumferentially arranged conveyor belts, having a draw-off guide roller arranged in a hot bath of liquids, and having an after-treatment zone for treating the glass foil, comprising the steps of:
   (a) heating glass in a smelting furnace until the glass reaches its melting point, and then conveying the glass through a distribution reservoir to annularly arranged distributing slots such that a plurality of jets of glass emerge from the distributing slots;
   (b) combining the plurality of jets of glass emerging from the distributing slots at a funnel-shaped wall to form a hollow, cylindrical mass of glass;

(c) flowing the hollow, cylindrical mass of glass downward due to its own weight through a heating and cooling zone, said zone being under pressure and being gas-heated, cooling off the glass for shaping, and grasping the hollow, cylindrical mass of glass with circumferentially arranged auxiliary conveyor belts;

(d) stretching the hollow, cylindrical mass of glass while still in its plastic state to a predetermined wall thickness with the auxiliary conveyor belts, then separating the hollow, cylindrical mass of glass on one side with a separating device and bending the mass of glass into a substantially planar mass of glass, and then conveying the planar mass of glass to a hot bath of liquids wherein a draw-off guide roller is arranged to draw-off glass foil in full width; and (e) conveying glass foil drawn-off by the draw-off guide roller from the bath of liquids through an after-treatment zone wherein the glass foil is treated to a coiling device, and then coiling the treated glass foil.

3. The process of claim 2 further comprising the step of laterally moving the auxiliary conveyor belts to break physical contact between the belts and the cylindrical mass of glass after the substantially planar mass of glass is conveyed to the bath of liquids and the glass foil is drawn-off by the draw-off guide roller.

4. Apparatus for producing glass foil using a gaseous blowing agent wherein a glass melt is continuously drawn in the form of a hollow, cylindrical glass mass from a heated crucible of a smelting furnace, comprising:

a revolving crucible, said crucible being electrically heated and having a pre-melting reservoir, a main-melting reservoir connected to the pre-melting reservoir, and a distribution reservoir connected to the main-melting reservoir;

an annular distributing disk, said disk being connected to the distribution reservoir and having a plurality of flow-through passages opening onto a funnel-shaped wall;

a packing/distance tube member for sealing the apparatus from the outside atmosphere;

heating and cooling means disposed about the hollow, cylindrical glass mass drawn from the crucible for forming a gas cushion about said glass mass;

conveyor belt means adjacent to said heating and cooling means for stretcing the hollow, cylindrical glass mass;

bath means for receiving and bathing glass;

a seal member coaxially disposed relative to said heating and cooling means and extending up to said bath means;

means for separating the hollow, cylindrical glass mass, said means being located between said seal member and said bath means;

draw-off guide roller means located in said bath means for drawing-off glass foil in full width from the glass received by said bath means;

after-treatment means located outside said bath means for receiving and treating the glass foil drawn-off in said bath means; and means for coiling the glass foil after said foil is treated by said after-treatment means.

5. The apparatus of claim 4 wherein the pre-melting reservoir, the main-melting reservoir and the distribution reservoir are each annular ducts separated by barrier members, each of said barrier members having a pass-through duct.

6. The apparatus of claim 4 wherein the smelting furnace includes a melting chamber and a glass-charge member opening into said melting chamber, said glass-charge member protruding above said pre-melting reservoir.

7. The apparatus of claim 4 wherein said heating and cooling means comprises a plurality of heating and cooling zones, said zones being connected with a main duct and with discharge apertures by ducts equipped with heaters.

8. The apparatus of claim 4 wherein said conveyor belt means comprises a plurality of conveyor belts, each of said conveyor belts having a drive cylinder, a guide cylinder and a low-pressure chamber disposed between said drive and guide cylinders, and further wherein said conveyor belts are laterally movable.

9. The apparatus of claim 4 wherein said draw-off guide roller means includes a guide roller and suction means for increasing the adhesion of the glass foil to the guide roller.

* * * * *